(12) United States Patent
Katsuragi et al.

(10) Patent No.: US 9,755,471 B2
(45) Date of Patent: Sep. 5, 2017

(54) STATOR OF ROTARY ELECTRIC MACHINE

(71) Applicants: Kota Katsuragi, Tokyo (JP); Shogo Okamoto, Tokyo (JP); Shinichiro Yoshida, Tokyo (JP)

(72) Inventors: Kota Katsuragi, Tokyo (JP); Shogo Okamoto, Tokyo (JP); Shinichiro Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 14/426,459

(22) PCT Filed: Feb. 15, 2013

(86) PCT No.: PCT/JP2013/053630
§ 371 (c)(1),
(2) Date: Mar. 6, 2015

(87) PCT Pub. No.: WO2014/125607
PCT Pub. Date: Aug. 21, 2014

(65) Prior Publication Data
US 2015/0214804 A1 Jul. 30, 2015

(51) Int. Cl.
*H02K 3/34* (2006.01)
*H02K 1/14* (2006.01)
*H02K 3/32* (2006.01)

(52) U.S. Cl.
CPC .............. *H02K 3/345* (2013.01); *H02K 1/148* (2013.01); *H02K 3/325* (2013.01)

(58) Field of Classification Search
CPC .......... H02K 3/345; H02K 3/325; H02K 3/38; H02K 1/148; H02K 1/18; H02K 15/10

USPC ......................................................... 310/215
See application file for complete search history.

(56) References Cited

U.S. PATENT DOCUMENTS

| 3,745,394 | A | * | 7/1973 | Mason | ................... | H02K 15/10 310/215 |
| 3,943,392 | A | * | 3/1976 | Keuper | .................. | H02K 3/345 174/DIG. 19 |
| 6,566,780 | B2 | * | 5/2003 | Niimi | ....................... | H02K 3/51 310/215 |
| 6,995,491 | B2 | * | 2/2006 | Kimura | .................. | H02K 3/345 310/215 |

FOREIGN PATENT DOCUMENTS

| JP | 2003-061286 A | 2/2003 |
| JP | 2006060980 A | * 3/2006 ............... H02K 3/34 |

(Continued)

OTHER PUBLICATIONS

Communication dated Mar. 29, 2016 from Japanese Patent Office in counterpart Application No. 2015-500050.

(Continued)

*Primary Examiner* — Tran Nguyen
(74) *Attorney, Agent, or Firm* — Sughrue Mion, PLLC; Richard C. Turner

(57) ABSTRACT

In a concentrated winding stator, which has a separated iron core structure, of a rotary electric machine, a length of ear portions 3c of insulating sheets 3, which are protruded between neighboring winding 4, is set as a length by which a creepage distance, which is required for an insulation between the neighboring windings 4, can be secured.

6 Claims, 6 Drawing Sheets

(56) References Cited

FOREIGN PATENT DOCUMENTS

| JP | 2007325450 A | * 12/2007 | ............... H02K 3/34 |
|---|---|---|---|
| JP | 2009-171720 A | 7/2009 | |
| JP | 2010-141963 A | 6/2010 | |

OTHER PUBLICATIONS

Translation of JP 2003-061286 A (previously cited Mar. 6, 2015).
Communication dated Oct. 27, 2015, issued by the Japan Patent Office in counterpart Japanese Application No. 2015-500050.
International Search Report of PCT/JP2013/053630 dated May 14, 2013 [PCT/ISA/210].
Communication dated Feb. 28, 2017 issued by the State Intellectual Property Office of People's Republic of China in counterpart Chinese application No. 201380073099.1.

* cited by examiner

FIG. 1
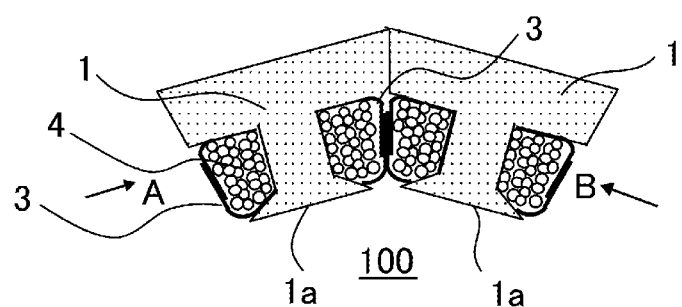
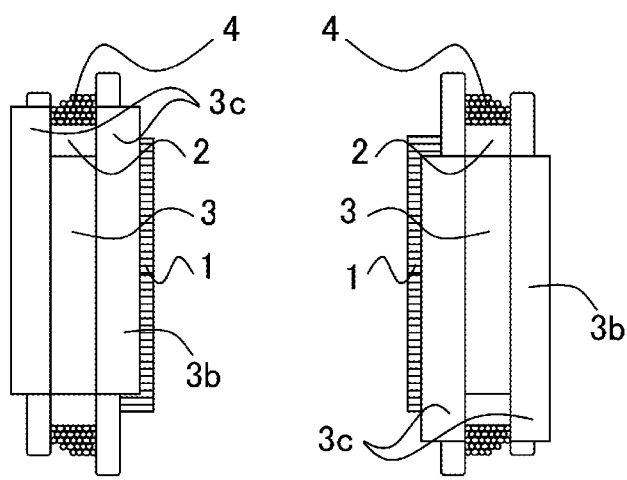
FIG. 2(a)    FIG. 2(b)

FIG. 5
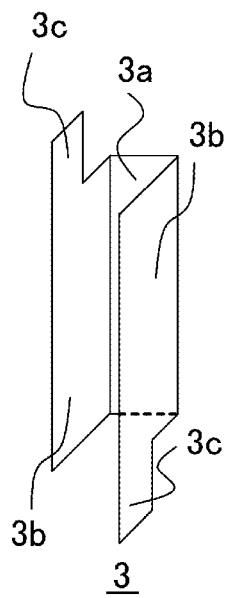
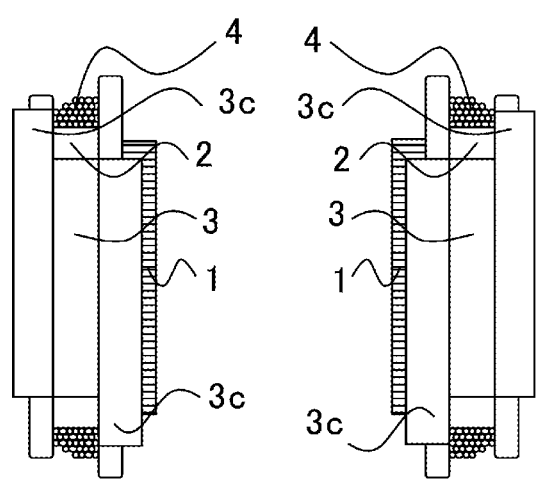
FIG. 6(a)    FIG. 6(b)

FIG. 7
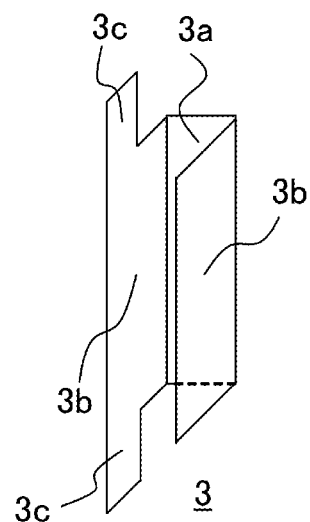
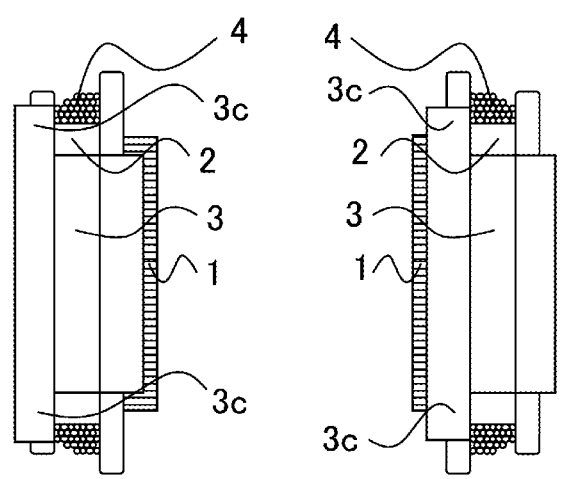
FIG. 8(a)      FIG. 8(b)

STATOR OF ROTARY ELECTRIC MACHINE

CROSS REFERENCE TO RELATED APPLICATIONS

This application is a National Stage of International Application No. PCT/JP2013/053630, filed Feb. 15, 2013, the contents of which are incorporated herein by reference in its entirety.

BACKGROUND OF THE INVENTION

Technical Field

The present invention relates to a stator of a rotary electric machine, and particularly relates to an improvement of an insulating sheet structure corresponding to a concentrated winding stator having a separated iron core structure.

Background Art

In recent years, while a compact and high-power rotary electric machine is realized, an amount of windings of a stator composed of laminated iron cores is increased, and the neighboring windings are closely arranged each other. Specifically, in a motor using a concentrated winding method, when a stator, which is configured by connecting a plurality of laminated iron cores in an annular shape, is used, different windings are wound around each of the laminated iron cores, so that the different windings are closed at a gap between the neighboring windings, and it is required that a portion between the windings is sufficiently insulated.

In a conventional stator of a rotary electric machine, it is general that insulating sheets are contacted to a lamination surface so as to be mounted at both sides of laminated iron cores, and windings are wound via the insulating sheets. The insulating sheets are composed of mounted portions, which are mounted at teeth portions of the laminated iron cores, and extended portions, which are extended from both surfaces of the mounted portions. The mounted portions are fixed by insulators which are arranged at both end portions in an axis direction of the laminated iron cores, and the extended portions are arranged so as to be doubly laminated and cover the windings, which are exposed at aperture sides of the insulators. Moreover, a length of the extended portions in an axis direction of the insulating sheets is longer than a length of a portion including the windings which are protruded from both end portions in an axis direction of the laminated iron cores, and extended portions (ear portions), which are longer than the mounted portions in the axis direction of the insulating sheets, are arranged so as to cover the windings which are protruded from both end portions in the axis direction of the laminated iron cores, whereby an insulation capability in between the windings is improved (for example, refer to Patent Document 1).

CONVENTIONAL ART DOCUMENT

Patent Document

Patent Document 1: Japanese Laid-Open Patent Publication No. 2009-171720 (lines 8 through 12 in page 2, and FIG. 3)

SUMMARY OF THE INVENTION

Problems to be Solved by the Invention

However, the windings are wound around the laminated iron cores so as to be fixed, so that there is a very few possibility in which the protruded portions of the neighboring windings are contacted each other. Moreover, a creepage distance between the neighboring windings has not been considered in determination of the length of the insulating sheets, so that an excessive length of the insulating sheets has been usually set. Therefore, using the extended portions of the insulating sheets which is longer than the length of the windings protruded from the both end portions in the axis direction of the laminated iron cores, in order to cover the whole windings, results in use of the excessive or wasted insulating sheets, so that a weight of the manufactured stator is increased, and a cost of the manufactured stator is increased.

In order to solve the above-described problems in which the excessive insulating sheets are wasted, the present invention supplies new structure of the insulating sheets in which the creepage distance is considered so as to secure insulations between neighboring windings, and a length of the used insulating sheets can be limited to a minimum length.

Means for Solving Problems

The present invention supplies a stator of a rotary electric machine, which is configured by connecting a plurality of separated cores in an annular shape, in which windings are wound around laminated iron cores having teeth portions via insulating sheets; wherein the insulating sheets are composed of mounted portions, which are mounted at teeth portions of the laminated iron cores, and extended portions, which are extended from both surfaces of the mounted portions, wherein a length in an axis direction of the extended portions, which are covered between the windings of the neighboring laminated iron cores, is limited to a length by which a creepage distance, which is required between the neighboring windings, can be secured.

Effects of the Invention

In a shape of the insulating sheets of the present invention, a length of the ear portions of the insulating sheets can be reduced to a length by which a creepage distance, which is required in order to insulate a portion between the neighboring windings, can be secured, whereby the insulating sheets, in which the ear portions of the insulating sheets are formed at only one side in an axis direction, are alternately arranged at side surfaces of the insulating sheets, and a length of the used insulating sheets can be limited to a minimum length, so that the insulating sheets have an effect in which a weight and a cost of the manufactured stator can be concurrently reduced.

BRIEF DESCRIPTION OF THE DRAWINGS

FIG. 1 is a partial schematic view of a front section of a stator of a rotary electric machine according to Embodiment 1 of the present invention;

FIGS. 2(*a*) and 2(*b*) are side schematic views of separated cores of the stator of the rotary electric machine according to Embodiment 1 of the present invention;

FIG. 5 is an oblique perspective schematic view of an insulating sheet which is used in a stator of a rotary electric machine according to Embodiment 2 of the present invention;

FIGS. 6(a) and 6(b) are side schematic views of separated cores of the stator of the rotary electric machine according to Embodiment 2 of the present invention;

FIG. 7 is an oblique perspective schematic view of an insulating sheet which is used in a stator of a rotary electric machine according to Embodiment 3 of the present invention;

FIGS. 8(a) and 8(b) are side schematic views of separated cores of the stator of the rotary electric machine according to Embodiment 3 of the present invention;

MODE FOR CARRYING OUT THE INVENTION

Embodiment 1

Figure 3:
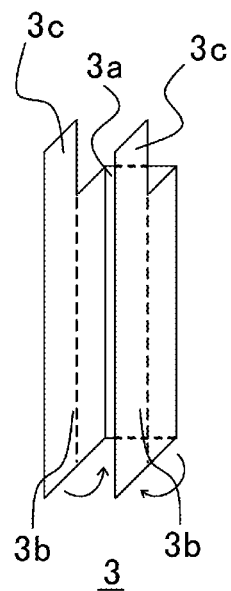
FIG. 3 is an oblique perspective schematic view of an insulating sheet which is used in the stator of the rotary electric machine according to Embodiment 1 of the present invention.

FIG. 1 is a partial front cross-sectional view of a stator of a rotary electric machine according to Embodiment 1 of the present invention. FIG. 2 are side schematic views of separated cores of the stator of the rotary electric machine according to Embodiment 1 of the present invention, and FIG. 2(a) is a drawing of the separated cores which are viewed from an arrow "A" side in FIG. 1, and FIG. 2(b) is a drawing of the separated cores which are viewed from an arrow "B" side in FIG. 1.

As illustrated in FIG. 1 and FIG. 2, insulating sheets 3, of which detailed explanation is described later, are fixed, by using a double-sided tape, an adhesive or the like, at both sides of teeth portions 1a of laminated iron cores 1 composing the separated cores. Moreover, insulators 2 are arranged at both end portions in an aids direction (in a vertical direction with respect to a plane in FIG. 1) of the laminated iron cores 1. In addition, the structure of the insulators 2 is identical to the structure which is explained with reference to Patent Document 1, so that a detailed explanation of the insulators 2 is omitted in Embodiment 1. Moreover, windings 4 are wound around the laminated iron cores 1 which are insulated by the insulating sheets 3 and the insulators 2, and the laminated iron cores 1, on which the windings 4 are provided, are connected in an annular shape, whereby a stator 100 of the rotary electric machine is formed (only two laminated iron cores 1 are illustrated in FIG. 1).

FIG. 3 is an oblique perspective schematic view of an insulating sheet which is used in the stator of the rotary electric machine according to Embodiment 1 of the present invention. As illustrated in FIG. 3, the insulating sheets 3 are composed of mounted portions 3a, which are mounted at side surfaces of the teeth portions 1a of the laminated iron cores 1, and extended portions 3b which are extended with a "]" shape from both end portions in a longitudinal direction of the mounted portions 3a to a vertical direction with respect to the axis direction of the laminated iron cores 1 at the insulating sheets 3. As illustrated in FIG. 1, the extended portions 3b of the insulating sheets 3 are further bent toward the inside (indicated by arrows), and the both extended portions 3b are overlapped so as to cover the windings 4. In other words, windings 4, which compose the neighboring separated cores, are contacted via four insulating sheets 3.

Moreover, as indicated in FIG. 3 according to Embodiment 1, in a direction of the insulating sheets 3 (referred to as an axis direction of the insulating sheets 3) which is parallel with respect to the axis direction of the laminated iron cores 1, lengths of the extended portions 3b are partially longer than lengths of the mounted portions 3a at only one side (upper side with respect to a plane in FIG. 3). Difference portions between the extended portions 3b and the mounted portions 3a in the axis direction of the insulating sheets 3 are referred to as ear portions 3c, and the length of the ear portions 3c corresponds to a height by which the creepage distance between the neighboring windings 4 can be secured.

Figure 4:
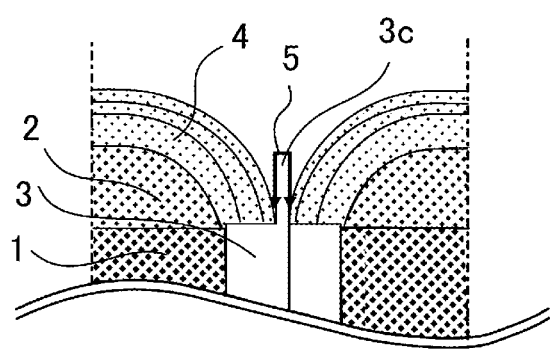
FIG. 4 is a schematic view illustrating a creepage distance at an ear portion of an insulating sheet between neighboring windings.

A creepage distance 5 represents a distance between conductive components, or a distance between a conductive component and a conductive connecting portion of a device, or a distance of a surface of a cabinet, and the creepage distance 5 represents a shortest distance which is measured along a surface of an insulator. FIG. 4 is a schematic view illustrating the creepage distance 5 at the ear portions 3c of the insulating sheets 3 between the neighboring windings 4. When the creepage distance 5 (a section indicated by the thick arrow line), which is required in order to secure an insulation between the windings 4, is, for example, 2 mm, and when the length of the ear portions 3c of the insulating sheets 3, which are arranged between the neighboring windings 4, is 1 mm, the creepage distance 5 between the neighboring windings 4 is secured as 2 mm.

In Embodiment 1, for example, a three-layered insulating sheet, in which a heat-resistant film is sandwiched between "Nomex®" papers, is used for a material of the insulating sheets 3, and the three-layered insulating sheet is cut out and bent, whereby the insulating sheets 3 are formed. Moreover, it is desirable that a thickness of the insulating sheets 3 is roughly set at 0.1 mm to 0.3 mm. When the thickness of the insulating sheets 3 is thinner than 0.1 mm, an insulation capability is not maintained, and when the thickness of the insulating sheets 3 is thicker than 0.3 mm, a material cost is increased.

Moreover, as described above, the length of the ear portions 3c of the insulating sheets 3 between the neighboring windings 4 is set by considering the creepage distance 5 which is required for an insulation between the windings 4, so that the insulating sheets 3, in which the ear portions 3c are formed at only one side in the axis direction, can be used, and the insulating sheets 3 can be alternately arranged as illustrated in FIG. 2. FIG. 2(a) indicates a case in which the ear portions 3c are positioned at an upper aide with respect to a plane in FIG. 2(a), and FIG. 2(b) indicates a case in which the ear portions 3c are positioned at a lower side with respect to a plane in FIG. 2(b).

As described above, in the insulating sheets 3 according to Embodiment 1, the length of the ear portions 3c of the insulating sheets 3 is set as the length of the creepage distance 5 which is required for the insulation between the windings 4, and the insulating sheets 3, in which the ear portions 3c are formed at only one side in the axis direction, are alternately arranged at each of the laminated on cores 1, whereby the neighboring windings 4 can be sufficiently insulated, and a length of the used insulating sheets 3 can be limited to a minimum length, so that a weight and a cost of the manufactured stator can be reduced.

Embodiment 2

FIG. 5 is an oblique perspective schematic view of an insulating sheet which is used in a stator of a rotary electric machine according to Embodiment 2 of the present invention, and FIG. 6 are side schematic views of separated cores of the stator of the rotary electric machine according to Embodiment 2 of the present invention, In Embodiment 1, the ear portions 3c of the insulating sheets 3 are formed at only one side in the axis direction, whereas in Embodiment 2 ear portions 3c of insulating sheets 3 are formed as illustrated in FIG. 5. In other words, the ear portions 3c, which are extended from extended portions 3b of the insulating sheets 3 in the axis direction, are formed at each of opposite sides.

The length of each of the ear portions 3c is identical to the length of the creepage distance 5 which is required for the insulation between windings 4. FIG. 6(a) indicates a case in which the insulating sheets 3 are arranged at teeth portions in a condition as illustrated in FIG. 5, and FIG. 6(b) indicates a case in which the insulating sheets 3 are arranged in a condition where the insulating sheets 3 illustrated in FIG. 5 are turned upside down (in reverse). Even when the ear portions 3c are formed as described above, the creepage distance 5, which is required between windings 4, can be secured, and a length of the used insulating sheets 3 can be limited to a minimum length, so that a weight and a cost of the manufactured stator can be reduced.

Embodiment 3

FIG. 7 indicates the other example of an insulating sheet which is used in a stator of a rotary electric machine according to Embodiment 3 of the present invention, and FIG. 8 are side schematic views of separated cores of the stator of the rotary electric machine according to Embodiment 3 of the present invention.

In a shape of insulating sheets 3 illustrated in FIG. 7, ear portions 3c, which are extended from one of extended portions 3b of the insulating sheets 3 to both sides in an axis direction, are formed. In a case of the shape of insulating sheets 3 illustrated in FIG. 7, the insulating sheets 3 are alternately arranged at laminated iron cores 1 as illustrated in FIG. 8, whereby a creepage distance 5, which is required between windings 4, can be secured, and a length of the used insulating sheets 3 can be limited to a minimum length, so that a weight and a cost of the manufactured stator can be reduced.

Embodiment 4

Figure 9:
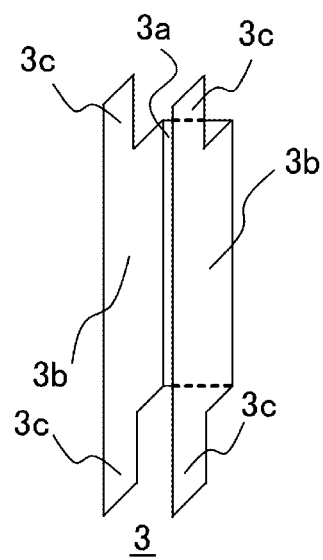
FIG. 9 is an oblique perspective schematic view of an insulating sheet which is used in a stator of a rotary electric machine according to Embodiment 4 of the present invention.
Figure 10:
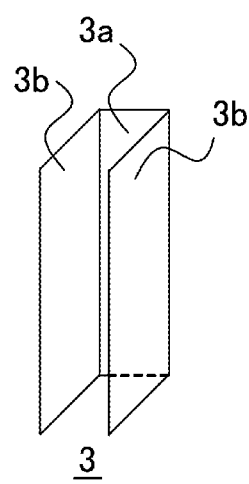
FIG. 10 is an oblique perspective schematic view of an insulating sheet which is used in the stator of the rotary electric machine according to Embodiment 4 of the present invention.
Figures 11A, 11B:
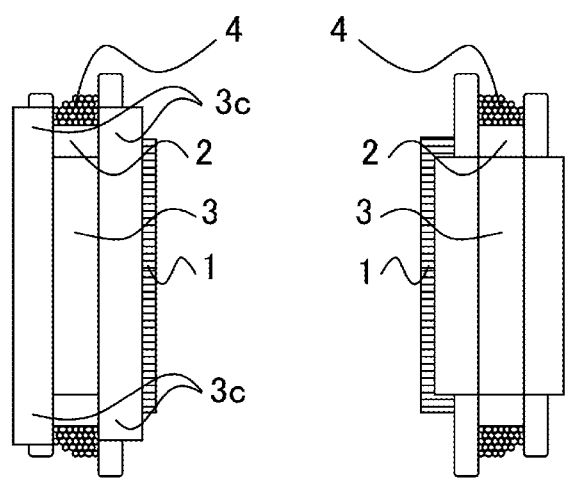
FIGS. 11(a) and 11(b) are side schematic views of separated cores of the stator of the rotary electric machine according to Embodiment 4 of the present invention.

FIG. 9 is an oblique perspective schematic view of an insulating sheet which is used in a stator of a rotary electric machine according to Embodiment 4 of the present invention, and FIG. 10 is an oblique perspective schematic view of an insulating sheet which is used in the stator of the rotary electric machine according to Embodiment 4 of the present invention. FIG. 11 are side schematic views of separated cores of the stator of the rotary electric machine according to Embodiment 4 of the present invention.

Insulating sheets 3 may be formed with shapes indicated in FIG. 9 and FIG. 10. As illustrated in FIG. 11, the insulating sheets 3 illustrated in FIG. 9 and the insulating sheets 3 illustrated in FIG. 10 are alternately arranged, whereby a creepage distance 5, which is required between windings 4, can be secured, and a length of the used insulating sheets 3 can be limited to a minimum length, so that a weight and a cost of the manufactured stator can be reduced.

DESCRIPTION OF THE SYMBOLS

"1" are laminated iron cores; "2," insulators; "3," insulating sheets; "3a" mounted portions; "3b," extended portions; "3c," ear portions; "4", windings; "5," a creepage distance; "100," a stator of a rotary electric machine.

What is claimed is:

1. A stator of a rotary electric machine, the stator is configured by connecting a plurality of separated cores in an annular shape, each separated core formed of a plurality of laminated iron cores and having windings wound around teeth portions of the laminated iron cores via insulating sheets; wherein
the insulating sheets are composed of mounted portions, which are mounted at the teeth portions of the laminated iron cores, and extended portions that extend from both sides of the mounted portions and have a portion that is covered between the windings of the neighboring laminated iron cores, the extended portions have a length in the axial direction that is longer than an axial length of the mounting portions and that is limited to a creepage distance length that is required in order to secure an insulation between the neighboring windings.

2. A stator of the rotary electric machine as recited in claim 1, wherein a length of at least a partial portion of the extended portions in an axial direction of the insulating sheets is longer than a length of a portion including the windings that protrude from both end portions in an axial direction of the laminated iron cores; and ear portions of the extended portion are longer than the mounted portions in the axial direction of the insulating sheets, and are arranged so as to cover the windings that protrude from both end portions in the axial direction of the laminated iron cores.

3. A stator of the rotary electric machine as recited in claim 2, wherein the ear portions are formed at only one side in the axial direction of the extended portions of the insulating sheets, and the ear portions are alternately arranged at side surfaces of the teeth portions of the laminated iron cores.

4. A stator of the rotary electric machine as recited in claim 2, wherein the ear portions, are formed at both sides in the axial direction and in each of opposite directions of the extended portions of the insulating sheets, and the ear portions are alternately arranged at side surfaces of the teeth portions of the laminated iron cores.

5. A stator of the rotary electric machine as recited in claim 2, wherein the ear portions are formed at both sides in the axial direction of one of the extended portions of the insulating sheets, and the ear portions are alternately arranged at side surfaces of the teeth portions of the laminated iron cores.

6. A stator of the rotary electric machine as recited in claim 2, wherein the insulating sheets having the ear portions formed at both sides in the axial direction of both extended portions of the insulating sheets, and the insulating sheets not having the ear portions, are alternately arranged at side surfaces of the teeth portions of the laminated iron cores.

* * * * *